Figure 1:
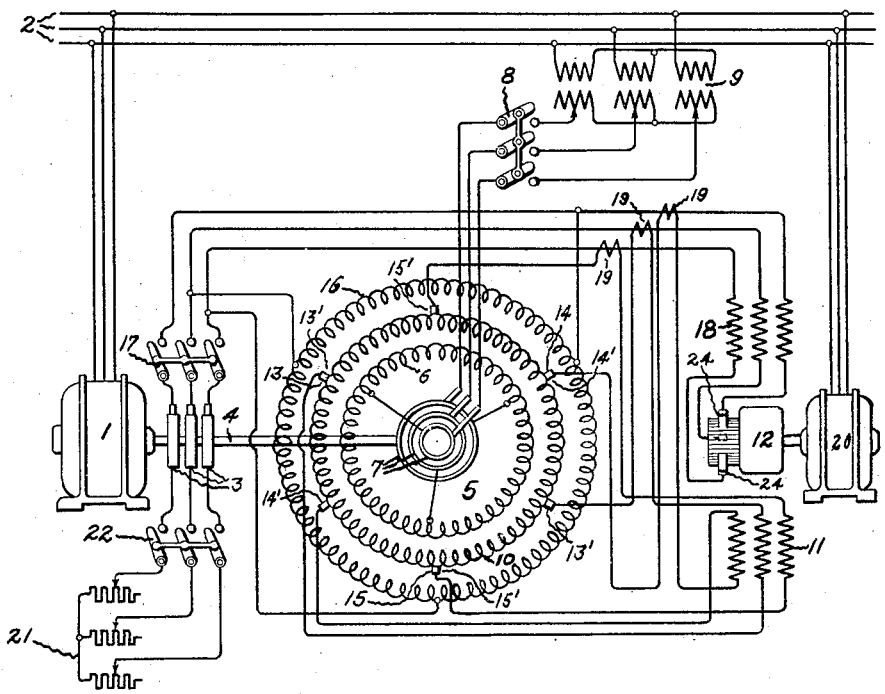

March 1, 1927. 1,619,673
J. I. HULL
SYSTEM OF SPEED CONTROL FOR INDUCTION MOTORS
Filed Sept. 10, 1923 2 Sheets-Sheet 2
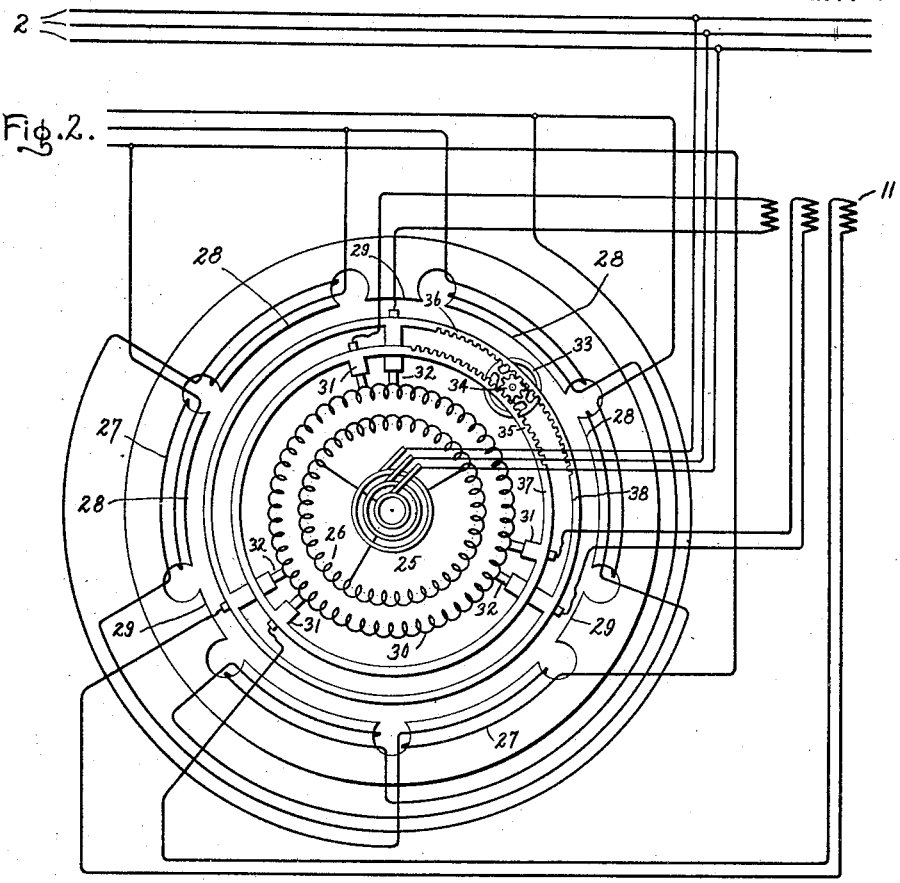
Fig. 2.
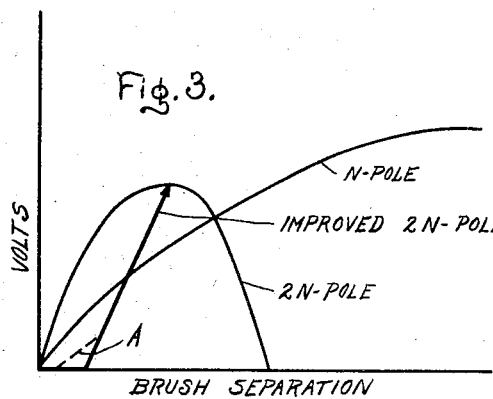
Fig. 3.
Fig. 4.
Inventor:
John I Hull;
by *Alexander S. Lint*
His Attorney.

Patented Mar. 1, 1927.

1,619,673

UNITED STATES PATENT OFFICE.

JOHN I. HULL, OF SCHENECTADY, NEW YORK, ASSIGNOR TO GENERAL ELECTRIC COMPANY, A CORPORATION OF NEW YORK.

SYSTEM OF SPEED CONTROL FOR INDUCTION MOTORS.

Application filed September 10, 1923. Serial No. 661,768.

My invention relates to systems of speed control for induction motors and especially to improvements in speed control systems wherein a polyphase commutator machine is concatenated with a load motor for the purpose of regulating its speed over a range including subsynchronous, synchronous and supersynchronous speeds.

It is well known that the speed of an induction motor may be readily and economically controlled by regulating the field of a commutator machine which is connected in cascade, or concatenated, with it. As pointed out in my Patent No. 1,306,594, granted June 10, 1919, if the shunt field winding of the commutator machine has impressed upon it a voltage of load motor slip frequency, obtained from the main motor collector rings, the phase and magnitude of the shunt field flux and therefore the phase relation between the commutator machine voltage and that of the load motor secondary winding varies, because of the shunt field inductance, as the speed of the load motor is changed, and the operation of the induction motor is thereby rendered unstable and uncertain at speeds in the neighborhood of synchronism.

The ideal source of power for exciting the shunt field winding of the commutator machine is one of load motor slip frequency having one component voltage for overcoming the reactance drop of the shunt field winding the value of which is proportional to the secondary frequency and induced voltage and another component for overcoming the resistance drop of the shunt field winding the value of which is independent of the load motor slip voltage, either the component voltages applied to the shunt field or its reactance and resistance being independently adjustable. In the past, control of the component voltages in the manner indicated has involved the use of an autotransformer with taps and an adjustable rheostat together with a set of contactors and a master controller or other switching means for changing the adjustment to vary the speed of the load motor, all of which increases the cost and complexity of the control apparatus. In accordance with my present invention the component voltages applied to the shunt field winding of the commutator machine are automatically regulated by a single exciting machine and the use of a transformer and rheostat together with the control apparatus incident thereto is avoided.

An object of my invention is to provide means for regulating the speed of an induction motor in a simple and effective manner.

A further object is to provide an exciting machine arranged to produce the component voltages required to properly excite a polyphase commutator regulating machine concatenated with an induction motor for the purpose of controlling its speed. A further object is to provide an improved polyphase exciting machine.

My invention will be better understood from the following description taken in connection with the accompanying drawing and its scope will be pointed out in the appended claims.

Referring now to the drawing, Fig. 1 shows an induction motor speed control system in which an exciting machine constructed in accordance with my invention has been embodied; Fig. 2 shows a modified form of exciting machine; Fig. 3 shows the relation of the voltage impressed on the field of the regulating machine to the separation of the exciter brushes; and Fig. 4 shows a modified form of stator structure suitable for use on the exciter shown in Fig. 2.

Fig. 1 shows an adjustable speed, N-pole induction motor 1 the primary winding of which is interconnected with a polyphase source of power 2 and the secondary winding of which is connected to the slip rings 3 mounted on the shaft 4 of the motor 1. Also mounted on the shaft 4 is an exciting machine 5 provided with an N-pole polyphase winding 6 arranged to be conductively associated with the source 2 through slip rings 7, switch 8, and adjustable transformer 9. Upon the stator of the exciter 5 is wound a 2 N-pole polyphase winding 16 arranged to be connected with the secondary winding of the motor 1 through switch 17 and slip rings 3. The exciter 5 is further provided with a commutated winding 10 arranged to rotate with the winding 6 and interconnected with the shunt field winding 11 of a regulating machine 12 for the purpose of supplying thereto exciting current of slip frequency, the winding 10 being inductively related to both windings 6 and 16 which are non-inductively wound with respect to each other and are connected to have opposite phase rotation. Arranged to cooperate with the commutator of the winding 10 are a plurality of movable brushes, provided for the purpose of controlling the magnitude of the voltage impressed upon the polyphase field winding 11, certain of these brushes being indicated by numerals 13, 14 and 15 to indicate the phase rotation of the polyphase voltage set up on the winding 10 by reason of its inductive relation with the N-pole winding 6 and these brushes together with the remaining brushes being indicated by the numerals 13′, 14′ and 15′ to indicate the phase rotation of the polyphase voltage set up in the 2 N-pole winding 10 due to its inductive relation with the winding 16. Connected in parallel with the 2 N-pole stator winding 16 of the exciter 5 is the armature winding of the regulating machine 12 which is arranged to be conductively associated with the secondary winding of the motor 1 through brushes 24, neutralizing field winding 18, switch 17 and slip rings 3. Current transformers 19 are connected in series with the shunt field winding 11 for the purpose of improving the power factor of the stator or primary winding of main motor 1. A suitable machine 20 is provided for the purpose of maintaining substantially constant the speed of the regulating machine 12. An adjustable resistor 21 may be arranged to be connected to the slip rings 3 through the switch 22 for the purpose of improving the starting and accelerating conditions of load motor 1.

The exciter 5 is provided for the purpose of supplying adjustable excitation to the shunt field winding 11 of the regulating machine 12 in such manner as to permit operation of the load motor 1 at subsynchronous, synchronous and supersynchronous speeds, and its use is of particular advantage both with respect to the simplicity with which regulation of the component voltages is effected and the smoothness with which the speed of the load motor is regulated. The N-pole winding 6, which is connected to have the same number of poles as the primary winding of the motor 1, and the 2 N-pole winding 16 are arranged in any of the various well known manners to be non-inductive with respect to each other but are each inductive with respect to the commutator winding 10 so that when energized by suitable sources of power both the N-pole and 2 N-pole windings will set up in the magnetic structure of the exciter 5 a rotating field the speed of which is in each case determined by the number of poles and the frequency of the applied voltages. By these rotating fields there will be set up between the commutator brushes component voltages which may be independently controlled to secure the desired resultant exciter voltage in a manner to be subsequently explained.

As previously indicated, the N-pole winding 6 is interconnected with the polyphase source 2 in such a way as to have its phase rotation in a sense opposite to that in which the exciter rotor is driven and the 2 N-pole winding 16 is interconnected with the secondary winding of the load motor to have its phase rotation for subsynchronous speeds of the load motor in the same sense as that in which the exciter rotor is driven. With this arrangement it is apparent that the N and 2 N-pole windings will each set up between brushes connected to opposite ends of the phases of the winding 11 a voltage of slip frequency the value of which will in each case be determined by the value of the voltage impressed on the particular winding and the brush position, speed of rotation, etc. Since the N-pole rotor winding 6 of the exciter 5 is connected to the constant voltage source 2 it will set up in the magnetic structure of the exciter a flux of substantially constant magnitude and there will be produced thereby in the commutator winding 10 a component polyphase voltage of substantially constant magnitude, any part of which may be impressed upon the shunt field winding 11 of the regulating machine 12 by proper adjustment of the exciter brush position. This component voltage may be utilized to overcome the ohmic drop of the winding 11. The flux set up in the exciter core by the 2 N-pole stator winding 16 will vary directly as the secondary voltage and inversely as the slip frequency of the load motor 1. There will thus be induced in the commutated winding 10 by rotation in the flux of the 2 N-pole winding 16 a component polyphase voltage the value of which is dependent mainly upon secondary voltage of the load motor 1, and any part of this voltage may be utilized to balance the inductive drop in the shunt field winding 11 of the regulating machine 12 by proper positioning of the exciter brushes.

If the brush positions on the exciter commutator corresponding to 120 electrical degrees referred to N poles (produced through winding 6) be denoted by the numerals 13, 14 and 15, and similar positions on the commutator referred to 2 n poles (produced through winding 16) be denoted by numerals 13′, 14′ and 15′ as indicated in Fig. 1 it is at once apparent that, due to the fact that the N-pole and 2 N-pole windings are connected to have opposite phase rotation, when the N and 2 N-pole windings and their cooperating brushes are so arranged that the positions 13 and 13′ coincide, then certain positions 14 and 14′ will coincide as will also certain positions 15 and 15′. It therefore follows that the brushes 13—13', 14—14' and 15—15' can have impressed on them simultaneously one component voltage of load motor slip frequency due to the rotating field set up by the N-pole winding and another component voltage of like frequency due to the rotating field set up by the 2 N-pole winding, the relative values of these components actually impressed upon the brushes being dependent upon the positions of the brushes. It is theoretically correct to consider the resultant polyphase voltage impressed on the shunt field 11 of the regulating machine 12 to be the vector sum of these two component voltages and, since one component voltage can be made to conform to the reactive drop of the shunt field winding, while the other component voltage can be made to conform to the ohmic drop of this winding, the exciter 5 is capable of exciting the regulating machine in such a way as to insure normal and stable operation of the motor 1 at all speeds.

Assuming the position of the various switches and brushes to be as shown in Fig. 1, the load motor 1 may be started from rest by closing the switch 22 with the resistor 21 in a position to introduce maximum resistance into the secondary circuit. The motor is then accelerated by gradually reducing the secondary resistance. When a speed resulting from short circuiting slip rings 3 by cutting out the resistor 21 has been reached, the regulating machine 12 having been previously brought up to speed, the switch 17 is closed, the switch 22 is opened and switch 8 is closed, thereby energizing the exciting windings 16 and 6 of the machine 5. Under these conditions the exciter brushes of each phase which have been previously set on equipotential points for both N and 2 N-poles will have no voltage set up between them and consequently no voltage is impressed on the shunt winding 11 of the machine 12. The load motor 1 will now operate as a normal induction motor having its secondary winding connected to the low resistance armature circuit of the regulating machine 12. If the brushes connected to the beginning of each phase of winding 11 be now moved in one direction around the exciter commutator while those connected to the ends of each phase be moved in the opposite direction, component voltages induced by the flux of the N and 2 N-pole windings respectively will be set up between them and the resultant of these component voltages will be impressed on the shunt field winding 11. These component voltages may be arranged to have any desired phase relation with respect to one another or with respect to other voltages or currents in the circuit. This may be accomplished by shifting the exciter stator, by shifting all the brushes to any desired degree in the same direction before or after or during the process of shifting in opposite directions, by shifting the brushes in opposite directions at different rates of shift, by changing the phase of the voltage applied to the collector rings 7 in any of the various well known ways; by shifting the phase of the exciter stator excitation supplied through the winding 16 or in any other well known manner. The component voltage produced by the N-pole winding 6 may thus be utilized to balance the ohmic drop of the shunt field 11, and the component produced by the 2 N-pole winding 16 may be utilized to balance its reactance drop. As a result of the adjustment of the brushes the speed of the motor will be changed in a well known manner and by similar adjustments the motor may be made to operate at any other desired speed.

The transformer 9 may be adjusted to control the voltage applied to the N-pole winding 6 both as to phase and magnitude and, if desired, a similar transformer may be inserted in the leads by which the 2 N-pole winding is interconnected with the secondary winding of the load motor. The exciter is shown as fixed to rotate with the shaft of the load motor 1. It is of course obvious that the exciting machine may be driven by any suitable means for maintaining it in exact synchronous relation with the main motor and that the number of exciter poles need not be the same as that of the main motor provided the proper speed relation is maintained between the two machines.

Fig. 2 shows a modified form of exciting machine 25 having certain desirable features not shown on the exciter 5 shown in Fig. 1. The exciter 5 is illustrated as a 4 pole 8 pole machine with half of the brushes omitted. The exciter 25 is provided with a 2 pole rotor winding 26 interconnected with the polyphase line 2 and a modified form of 4 pole stator winding 27 adapted to be interconnected with the secondary winding of the main motor 1. (See Fig. 1.) The winding 27 is concentrated in zones 28 separated as illustrated by zones 29 in which no magnetizing force will be exerted. The windings 26 and 27 are non-inductively arranged with respect to each other but are both inductively associated with a commutator winding 30 adapted to cooperate with brushes 31 and 32 arranged to be shifted in opposite directions by means of a hand wheel 33 and pinion 34 which meshes with racks 35 and 36 of the brush supporting structures 37 and 38 respectively. When the brushes are slightly separated under a zone 29 no voltage is impressed on them by the stator winding 27. As they are separated further and pass under the zones 28 they will pick up voltages as indicated in Fig. 3.

In Fig. 3 the distance between brushes connected to opposite ends of the phases of the winding 11 are plotted as abscissæ and the voltage between these brushes are plotted as ordinates. Thus the curve labeled "N-pole" shows the voltage impressed on the brushes due to either the winding 6 of Fig. 1 or the winding 26 of Fig. 2, the curve labeled "2 N-pole" shows the voltage impressed on the brushes due to the distributed winding 16 of Fig. 1, and the curve labeled "Improved 2 N-pole" shows the voltage impressed on the brushes 31 and 32 of Fig. 2 due to the concentrated winding 27. The curve labeled "Improved 2 N-pole" may be made to assume the form indicated by the dotted line "A" in Fig. 3 if the stator winding 27 is arranged, as shown in Fig. 4, not in two slots but in two or more slots in the zones 27'. By increasing the number of slots on one side of the winding the curve may thus be made to approximate almost any desired form.

I have explained my invention by illustrating and describing certain specific embodiments thereof, but it will be readily understood by those skilled in the art that the invention may be embodied in many other forms than those shown and described. I, accordingly, do not wish to be restricted to the particular forms or constructions disclosed herein by way of example for the purpose of setting forth my invention in accordance with the patent statutes. The terms of the appended claims are, therefore, not restricted to the precise structures disclosed, but are intended to cover all changes and modifications within the spirit and scope of my invention.

What I claim as new and desire to secure by Letters Patent of the United States, is,—

1. A system of speed control wherein an induction motor arranged to be supplied with current from a suitable source of power is concatenated with a regulating machine provided with a shunt field winding and wherein a voltage of the same frequency as that of the slip current of said induction motor is impressed on said shunt field winding and is varied to control the speed of said induction motor, characterized by the fact that a machine provided for exciting said winding is arranged to generate independently adjustable component voltages which are substantially proportional to the shunt field ohmic and reactive drops respectively.

2. A system of speed control wherein an induction motor arranged to be supplied with current from a suitable source of power is concatenated with a regulating machine provided with a shunt field winding and wherein a voltage of the same frequency as that of the slip current of said induction motor is impressed on said shunt field winding and is varied to control the speed of said induction motor, comprising an exciting machine provided with a polyphase exciting winding arranged to be interconnected with the secondary winding of said induction motor, a second polyphase exciting winding arranged to be interconnected with said source of power so as to be excited at the same frequency as that of said source, and a commutated winding inductively related to said exciting windings and arranged to supply current to said shunt field winding.

3. A system of speed control wherein an induction motor arranged to be supplied with current from a suitable source of power is concatenated with a regulating machine provided with a shunt field winding and wherein a voltage of the same frequency as that of the slip current of said induction motor is impressed on said shunt field winding and is varied to control the speed of said induction motor, comprising an exciting machine provided with a polyphase exciting winding arranged to be interconnected with the secondary winding of said induction motor, a second polyphase exciting winding non-inductively related to said first mentioned exciting winding and arranged to be interconnected with said source of power, and a commutated winding inductively related to both said exciting windings and arranged to supply current to said shunt field.

4. A system of speed control wherein an induction motor arranged to be supplied with current from a suitable source of power is concatenated with a regulating machine provided with a shunt field winding and wherein a voltage of the same frequency as that of the slip current of said induction motor is impressed on said shunt field winding and is varied to control the speed of said induction motor, comprising an exciting machine provided with an N-pole exciting winding arranged to be interconnected with said source of power, a 2N pole exciting winding arranged to be interconnected with the secondary winding of said induction motor, and a commutated winding inductively related with said N-pole and 2N pole exciting windings and arranged to supply current to said shunt field winding.

5. A system of speed control wherein an induction motor arranged to be supplied with current from a suitable source of power is concatenated with a regulating machine provided with a shunt field winding and wherein a voltage of the same frequency as that of the slip current of said induction motor is impressed on said shunt field winding and is varied to control the speed of said induction motor, comprising a polyphase exciter provided with an N-pole rotor winding arranged to be interconnected with said source of power, a 2N-pole stator winding non-inductively related to said N-pole winding and arranged to be interconnected with the secondary winding of said induction motor, and a polyphase commutated winding inductively related to said N-pole and 2N-pole windings and arranged to supply current to said shunt field winding.

6. A system of speed control wherein an induction motor arranged to be supplied with current from a suitable source of power is concatenated with a regulating machine provided with a shunt field winding and wherein a voltage of the same frequency as that of the slip current of said induction motor is impressed on said shunt field winding and is varied to control the speed of said induction motor, comprising a polyphase exciting machine provided with an N-pole rotor winding connected to have its phase sequence in a direction opposite to that in which said exciting machine is driven and arranged to be interconnected with said source of power, a 2N-pole stator winding connected to have its phase sequence in the same direction as that in which said generator is driven and arranged to be interconnected with the secondary winding of said induction motor, said N-pole and 2N-pole windings being non-inductively related to each other and a polyphase commutated winding inductively related to said N-pole and 2N-pole windings for supplying to said shunt field winding current of the same frequency as that of the slip current of said induction motor.

7. A system of speed control wherein an induction motor arranged to be supplied with current from a suitable source of power is concatenated with a regulating machine provided with a shunt field winding and wherein a voltage of the same frequency as that of the slip current of said induction motor is impressed on said shunt field winding and is varied to control the speed of said induction motor, comprising an exciting machine provided with a polyphase exciting winding arranged to be interconnected with the secondary winding of said induction motor, a second polyphase exciting winding arranged to be interconnected with said source of power, a commutated winding inductively related to said exciting windings, brushes associated with the opposite ends of the different phases of said shunt field winding, and means for shifting the brushes associated with opposite ends of each phase of said shunt field winding in opposite directions whereby the voltage impressed on said shunt field winding may be varied.

8. A system of speed control wherein an induction motor arranged to be supplied with current from a suitable source of power is concatenated with a regulating machine provided with a shunt field winding and wherein a voltage of the same frequency as that of the slip current of said induction motor is impressed on said shunt field winding and is varied to control the speed of said induction motor, comprising an exciting machine provided with a polyphase exciting winding arranged to be interconnected with the secondary winding of said induction motor, a second polyphase exciting winding non-inductively related to said first mentioned exciting winding and arranged to be interconnected with said source of power, a commutated winding inductively related to said exciting windings, brushes associated with the opposite ends of the different phases of said shunt field winding, and means for shifting the brushes associated with opposite ends of each phase of said shunt field winding in opposite directions whereby the voltage impressed on said shunt field winding may be varied.

9. A system of speed control wherein an induction motor arranged to be supplied with current from a suitable source of power is concatenated with a regulating machine provided with a shunt field winding and wherein a voltage of the same frequency as that of the slip current of said induction motor is impressed on said shunt field winding and is varied to control the speed of said induction motor, characterized by the fact that a machine interconnected with said source of power and the secondary winding of said induction motor is provided with brushes arranged to be shifted to regulate the component voltages impressed on said shunt field winding.

In witness whereof, I have hereunto set my hand this 8th day of September, 1923.

JOHN T. HULL.